UNITED STATES PATENT OFFICE.

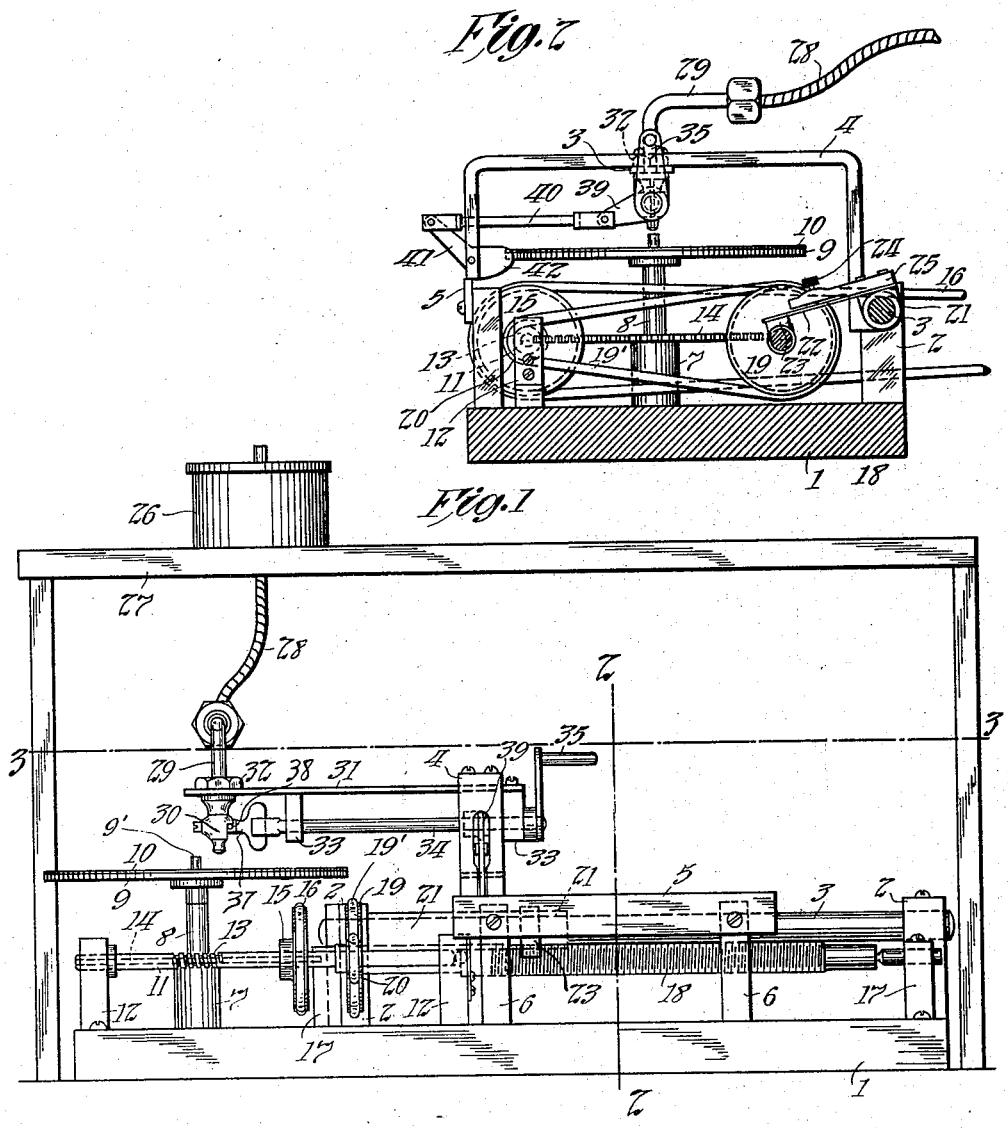

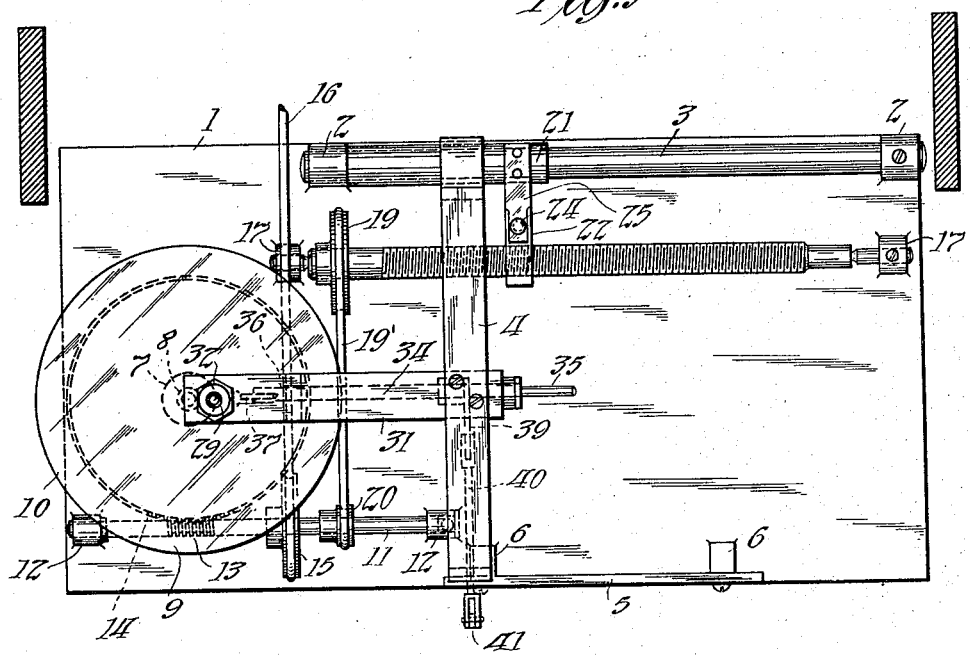

THOMAS A. EDISON, OF LLEWELLYN PARK, WEST ORANGE, NEW JERSEY, ASSIGNOR TO NEW JERSEY PATENT COMPANY, OF WEST ORANGE, NEW JERSEY, A CORPORATION OF NEW JERSEY.

COATING APPARATUS.

1,201,448.  Specification of Letters Patent.  Patented Oct. 17, 1916.

Application filed October 26, 1912. Serial No. 727,829.

*To all whom it may concern:*

Be it known that I, THOMAS A. EDISON, a citizen of the United States, and a resident of Llewellyn Park, West Orange, in the county of Essex and State of New Jersey, have invented certain new and useful Improvements in Coating Apparatus, of which the following is a description.

My invention relates to coating apparatus and is intended more particularly, but not exclusively, for use in connection with the process for forming molded articles which is set forth and claimed in an application of Jonas W. Aylsworth, Serial No. 674,289, filed January 30, 1912. According to this process, a base or backing is provided with a surface covering or veneer of suitable moldable material, the process involving the formation of the surface veneer upon the smooth polished surface of a metallic plate or other blank mold and the subsequent transfer of the same under heat and pressure to the surface of the object to be coated with the firm adhesion or welding of the surface veneer to the object. In the formation of the surface veneer on the mold or transfer plate prior to the welding of the veneer to the base or backing, the surfacing material or "stock" in solution or fluid form is coated to a suitable thickness upon the mold or transfer plates and then dried and hardened.

My invention relates particularly to apparatus whereby the said surfacing material may be conveniently and homogeneously applied to or coated upon the surface of the mold or transfer plate.

The object of my invention is to provide an improved device of this character.

In order that my invention may be more clearly understood, attention is hereby directed to the accompanying drawings forming a part of this specification and in which—

Figure 1 represents a front elevation of one embodiment of my invention; Fig. 2 represents a view of the same, partly in side elevation and partly in section taken on line 2—2 of Fig. 1, the receptacle for the surfacing material and its support being omitted; and Fig. 3 represents a plan view, partly in section, on line 3—3, Fig. 1.

In all the views like parts are designated by the same reference numerals.

The apparatus shown comprises a bed plate or base 1 provided with standards 2, 2, in which the guide rod 3 is mounted. A traveling carriage 4 is pivotally and slidably mounted on the guide rod 3 and rests at its forward end upon a straight edge 5 which is supported by standards 6, 6, at the forward end of the base 1. The bed plate or base 1 at one side of the guide rod 3 is provided with a bearing 7 in which is rotatably mounted the shaft 8 of the turntable or support 9, which latter is provided with a centering pin 9' and has secured to its upper surface a covering 10 of rubber or other similar material.

For driving the shaft 8 and turntable 9, I provide a horizontal shaft 11 mounted in bearings 12 on the bed plate or base and formed intermediate its ends with a worm 13 meshing with a gear 14 secured to the shaft 8. A pulley 15 is secured to the shaft 11 and is rotated by a belt 16 driven by a motor (not shown) or any other suitable source of power. Rotatably mounted in standards 17, 17 on the bed plate is the feed screw 18 secured to which is a pulley 19 adapted to be rotated by a belt 19' driven by a pulley 20 secured to the shaft 11. The traveling carriage 4 is provided with a tubular extension 21 surrounding guide rod 3 to which extension is secured a spring support 22 carrying at its free end a feed nut 23 adapted to engage the feed screw when the forward end of the carriage rests in engagement with the straight edge 5 and to be disengaged therefrom when the forward end of the carriage is raised. A screw 24 threaded into an arm 25 secured to the tubular extension 21 of the carriage above the spring 22 serves to adjust the position of the feed nut with respect to the feed screw.

The stock or surfacing material is preferably carried in a tank or receptacle 26 mounted on a frame 27 extending over the bed plate 1 and the parts carried thereby. The receptacle 26 is provided at its lower end with a flexible outlet tube 28 which is connected to and communicates with a rigid angular tube 29 leading to the outlet nozzle 30. The tube 29 passes through one end of a horizontal arm or extension 31 secured at its other end to the under side of the traveling carriage 4, a nut 32 threaded on the tube 29 bearing against the upper surface of the arm or extension 31 and clamping the outlet nozzle 30 against the under side of the latter so that the tube and nozzle are firmly supported by the arm or extension at a fixed distance from the table or support 9 and are moved during the travel of the carriage transversely over the top of the said table or support, the arm 31 being of such a length that the outlet nozzle is readily movable from the center of the turntable or support to a position beyond the periphery thereof.

Depending from the lower side of the arm or extension 31 are bearings 33, 33 in which a rod 34 is rotatably mounted, this rod having at one end a crank 35 for rotating the same and at its opposite end a forked portion 36 fitting over the flattened thumb piece of a rotary valve 37 controlling the opening and closing of the nozzle 30.

The numeral 38 designates a stop pin adapted to engage a shoulder on outlet nozzle 30 to limit the movement of the valve 37 in one direction. The rod 34 has secured thereto a crank arm 39 connected by a link 40 to the cam lever 41 pivoted at the forward end of the traveling carriage 4. The cam lever 41 is provided with a cam surface 42 which is so shaped that when the crank 35 is in a position corresponding with the open position of the valve, the carriage 4 is permitted to engage the straight edge 5 and the feed nut 23 to engage the feed screw 18, whereas when the member 35 is in a position corresponding to the closed position of the valve 37, the carriage 4 and nozzle 30 will be lifted by the engagement of the cam surface 42 with the straight edge 5 and the feed nut 23 disengaged from the feed screw 18.

The operation of the device is as follows: The crank 35 being in a position corresponding to the closed position of the valve 37 and the disengagement of the feed nut 23 from the feed screw 18, the mold or transfer plate or other article to be coated is placed centrally upon the support or turntable 9 and the carriage 4 shifted by hand to bring the outlet nozzle 30 over the center of the said table or support. The driving means for the belt 16 having been set into operation, the turntable or support together with article carried thereby and also the feed screw 18 will be set into rotation. Member 35 is then rotated to open the valve 37 and place the feed nut 23 in engagement with the feed screw 18, after which the carriage will be fed away from the center of the turntable or support and the stock or surfacing material automatically fed in a spiral path upon the article to be coated. The valve 37 may be closed and the travel of the carriage 4 stopped at will by rotation of crank 35. I have found that a smooth and uniform coating free from imperfections can be obtained in this way. It is to be noted that movement of crank 35 in one direction simultaneously causes the nozzle 30 to be closed and moved away from support 9 and feed nut 23 to be disengaged from the feed screw 18; whereas movement of the crank in the opposite direction simultaneously causes the nozzle 30 to be opened and moved toward the support 9 and the feed nut 23 to be moved into engagement with the feed screw 18. The crank 35 may be moved at will to effect the operations just referred to regardless of the position of the nozzle 30 in its path of travel across the support 9. When the feed nut is disengaged from the feed screw, the carriage 4 and the parts carried thereby are free to be moved by hand transversely of the support 9.

Numerous changes may be made in the specific structure herein disclosed without departing from the spirit of my invention and I do not, therefore, limit myself to the exact details shown and described.

What I claim as new and desire to protect by Letters Patent is as follows:

1. In apparatus of the class described, the combination of a support, stock supplying means having an outlet in proximity to said support, and means for closing said outlet, means for producing a relative feeding movement between said support and stock supplying means, and unitary means for rendering said feed producing means inoperative and said closing means operative at different points throughout the relative feeding movement between said support and stock supplying means, substantially as described.

2. In apparatus of the class described, the combination of a support, stock supplying means having an outlet in proximity to said support and means for closing said outlet, means for producing a relative feeding movement between said support and stock supplying means, and means for simultaneously rendering said feed producing means inoperative and said closing means operative, said feed producing means when rendered inoperative permitting free relative movement between said support and stock supplying means in a direction transverse to said support, substantially as described.

3. In apparatus of the class described, the combination of a support, stock supplying means having an outlet in proximity to said support, and means for closing said outlet, means for producing a relative feeding movement between said support and stock supplying means, and unitary means for rendering said feed producing means operative and said closing means inoperative at different points throughout the relative feeding movement between said support and stock supplying means, substantially as described.

4. In apparatus of the class described, the combination of a support, a traveling carriage, stock supplying means carrried by said carriage and having an outlet and a valve for closing said outlet, feeding means for said carriage comprising a feed screw and a feed nut carried by said carriage and movable into and out of engagement with said feed screw, and means for simultaneously closing said valve and moving said carriage to disengage said feed nut from said feed screw, substantially as described.

5. In apparatus of the class described, the combination with a support, stock supplying means having an outlet device in operative relation to said support and rotary means for closing said device, and means for producing a relative feeding movement between said support and stock supplying means, of means for simultaneously moving said outlet device away from said support and rendering said closing means operative to close said outlet device, substantially as described.

6. In apparatus of the class described, the combination with a support, stock supplying means having an outlet device in operative relation to said support and rotary means for closing said device, and means for producing a relative feeding movement between said support and stock supplying means, of means for simultaneously moving said outlet device toward said support and rendering said closing means inoperative to close said outlet device, substantially as described.

7. In apparatus of the class described, the combination with a support, stock supplying means having an outlet device in operative relation to said support and rotary means for closing said device, and means for producing a relative feeding movement between said support and stock supplying means, of means comprising a single controlling member for moving said outlet device away from said support and rendering said closing means operative to close said outlet device, substantially as described.

8. In a device of the class described, the combination with a support, stock supplying means having an outlet device in operative relation to said support and rotary means for closing said device, and means for producing a relative feeding movement between said support and stock supplying means, of means comprising a single controlling member for moving said outlet device toward said support and rendering said closing means inoperative to close said outlet device, substantially as described.

9. In apparatus of the class described, the combination of a support, a pivotally mounted traveling carriage, stock supplying means carried by said carriage and having an outlet and a valve for closing said outlet, feeding means for said carriage comprising a feed screw and a feed nut carried by said carriage and movable into and out of engagement with said feed screw, and means for simultaneously closing said valve and moving said carriage about its pivotal axis to disengage said feed nut from said feed screw, substantially as described.

10. In apparatus of the class described, the combination of a support, a pivotally mounted traveling carriage, stock supplying means carried by said carriage and having an outlet and a valve for closing said outlet, feeding means for said carriage comprising a feed screw and a feed nut carried by said carriage and movable into and out of engagement with said feed screw, and means comprising a single controlling member mounted on said carriage for simultaneously closing said valve and moving said carriage about its pivotal axis to disengage said feed nut from said feed screw, substantially as described.

11. In apparatus of the class described, the combination with a support, stock supplying means having an outlet device in operative relation to said support and means for closing said device, and means for producing a relative feeding movement between said support and said outlet device, of means for simultaneously moving said outlet device away from said support, rendering said closing means operative to close said outlet device, and rendering said feed producing means inoperative, substantially as described.

12. In apparatus of the class described, the combination with a support, stock supplying means having an outlet device in proximity to said support and means for closing said device, and means for producing a relative feeding movement between said support and said outlet device, of means for simultaneously moving said outlet device toward said support, rendering said closing means inoperative to close said outlet device, and rendering said feed producing means operative, substantially as described.

This specification signed and witnessed this 25th day of October, 1912.

THOS. A. EDISON.

Witnesses:
FREDERICK BACHMANN,
MARY J. LAIDLAW.

Copies of this patent may be obtained for five cents each, by addressing the "Commissioner of Patents, Washington, D. C."